United States Patent [19]

Lempicki et al.

[11] Patent Number: 5,602,715

[45] Date of Patent: Feb. 11, 1997

[54] COLLAPSIBLE KEYBOARD STRUCTURE FOR A NOTEBOOK COMPUTER, RESPONSIVE TO OPENING AND CLOSING OF THE COMPUTER'S LID VIA RELATIVELY SHIFTABLE KEY SUPPORT MEMBER AND SHIFT MEMBER

[75] Inventors: Michael S. Lempicki, Cypress; Harold S. Merkel; Charles A. Sellers, both of Houston; Kevin F. Clancy, Spring; Matthew L. Webb, Houston, all of Tex.

[73] Assignee: Compaq Computer Corporation, Houston, Tex.

[21] Appl. No.: 610,216

[22] Filed: Mar. 4, 1996

Related U.S. Application Data

[63] Continuation-in-part of Ser. No. 268,818, Jun. 30, 1994, Pat. No. 5,532,904.

[51] Int. Cl.⁶ .............................. G06F 1/16; B41J 11/56; H05K 7/04; H01H 13/02

[52] U.S. Cl. .................. 361/680; 400/490; 400/682; 200/5 A; 200/344; 200/345

[58] Field of Search .................. 400/479, 488, 400/490–492, 682; 200/5 A, 344, 345; 235/1 D, 145 R, 146; 364/708.1; 341/22; 361/680

[56] References Cited

U.S. PATENT DOCUMENTS

| | | | |
|---|---|---|---|
| 5,268,545 | 12/1993 | Bruner | 200/345 |
| 5,463,195 | 7/1994 | Watanabe et al. | 200/344 |
| 5,466,901 | 11/1995 | Mochizuki | 200/5 A |
| 5,532,904 | 7/1996 | Sellers | 361/680 |

*Primary Examiner*—Michael W. Phillips
*Attorney, Agent, or Firm*—Konneker & Smith

[57] ABSTRACT

A notebook computer is provided with a collapsible keyboard structure having keys supported on scissored linkage arm assemblies in which, in response to closing of the computer housing lid, key return spring portions of the keyboard are shifted away from their normal underlying relationships with the keys, and the scissored linkage arm assemblies and keys are permitted to retract to a storage/transport orientation in which the overall thickness of the keyboard structure is reduced by an amount essentially equal to the stroke distance of the keys. When the lid is subsequently opened, the key return spring portions are shifted back to their normal underlying relationships with the keys, and the keys and scissored linkage arm assemblies are forced outwardly by the return spring portions to their extended, operative orientations above the return spring portions. A spaced series of elastomeric key return dome members is secured to a shift member which is slidably mounted on the top side of a multilayered signal pad structure.

20 Claims, 9 Drawing Sheets

COLLAPSIBLE KEYBOARD STRUCTURE FOR A NOTEBOOK COMPUTER, RESPONSIVE TO OPENING AND CLOSING OF THE COMPUTER'S LID VIA RELATIVELY SHIFTABLE KEY SUPPORT MEMBER AND SHIFT MEMBER

CROSS-REFERENCE TO RELATED APPLICATION

This application is a continuation-in-part of U.S. application Ser. No. 08/268,818 filed Jun. 30, 1994 U.S. Pat. No. 5,532,904.

BACKGROUND OF THE INVENTION

1. Field of the Invention

The present invention relates generally to electronic devices, and more particularly relates to keyboard structures for portable computers such as notebook computers.

2. Description of Related Art

In recent years electronic devices, particularly notebook computers, have made considerable gains in both popularity and technical sophistication. One factor contributing to the increasing popularity of the notebook computer is its ever decreasing size and weight, a factor arising from the ability to fabricate various components of the computer in smaller and smaller sizes while, in many cases, increasing the power and/or operating speed of such components.

One continuing challenge in the design of notebook computers, however, is the keyboard structure. This design challenge arises from two conflicting design goals—the desire to even further reduce the size of the keyboard structure, and the desirability of having the notebook computer emulate as closely as possible the size and typing "feel" of a desktop computer keyboard.

There are, of course, two dimensional factors which may be varied to reduce the size of a notebook computer keyboard structure—its horizontal dimensions (i.e., its length and width), and its vertical or thickness dimension. The horizontal dimensions of the keyboard are governed by the number, size, and relative spacing of the manually depressible key cap portions of the keyboard, and various reductions in these three dimensional factors may be utilized to reduce the overall length and/or width of the keyboard. However, as will be readily appreciated, a reduction in these three configurational aspects to gain a keyboard size reduction correspondingly lessens the similarity of the notebook computer keyboard in appearance, key arrangement and typing feel to its desktop counterpart.

Similar restraints are also presented when attempts are made to reduce the overall thickness of a notebook computer keyboard. One possibility which has been investigated and attempted is to simply reduce the keystroke distance in the notebook computer keyboard compared to its desktop counterpart. Using this design technique, the overall thickness of the notebook computer in its closed storage and transport orientation may be correspondingly reduced. However, this thickness reduction in the overall notebook computer, achieved by reducing the keyboard keystroke distance, creates what many users consider to be an undesirable typing "feel" difference compared to the longer keystroke distance typically found in a larger desktop computer keyboard.

As can be readily seen from the foregoing, it would be desirable to provide an improved keyboard structure for an electronic device, such as a notebook computer, which permits a useful thickness reduction in the closed computer without a corresponding reduction in the operative keystroke distance of the keyboard structure. It is accordingly an object of the present invention to provide such an improved keyboard structure for an electronic device.

SUMMARY OF THE INVENTION

In carrying out principles of the present invention, in accordance with a preferred embodiment thereof, an electronic device, representatively a notebook computer, is provided with a specially designed collapsible keyboard structure. The computer includes a base housing portion having a top side, and a lid housing portion secured to the base housing portion for pivotal movement relative thereto between a closed position in which the lid housing portion extends across and covers the top side, and an open position in which the lid housing portion uncovers and exposes the top side of the base housing portion.

The collapsible keyboard structure, in a preferred embodiment thereof, includes a key support structure anchored to the base housing and extending across its top side. A series of keys are carried on the top side of the key support structure for vertical movement relative thereto, through a key stroke distance, between upwardly extended operative positions and downwardly retracted nonoperative positions in which the overall vertical thickness of the keyboard structure is reduced by the key stroke distance. Preferably, the keys are secured to the key support structure by scissored linkage arm assemblies having central portions with mutually angled bearing and cam surfaces thereon.

A base structure, representatively a multi-layered signal pad structure with a spaced series of elastomeric key return dome members on its upper side, underlies the key support structure and a dome sheet thereof, on which the key return dome members are carried, is carried for horizontal movement relative to the key support structure between a first position in which the key return members underlie and upwardly engage the linkage assembly bearing surfaces and resiliently hold the keys in their upwardly extended operative positions, and a second position in which the key return members are horizontally offset from the bearing surfaces and permit the keys to move to their downwardly retracted nonoperative positions.

Preferably, first shifting means are provided for shifting the dome sheet of the signal pad structure from its second position to its first position in response to opening of the lid housing portion, and second shifting means are provided for shifting the dome sheet from its first position to its second position in response to closing of the lid housing portion. When the dome sheet is shifted from its second position to its first position, the key return dome members engage the cam surfaces and extend the scissored linkage mechanisms to once again place the dome members in underlying engagement with the bearing surfaces of the linkage assemblies.

According to another feature of the invention, drive projections are formed on the top side of the dome sheet and are operative, in response to the shifting of the dome sheet from its first position to its second position, to engage and move portions of the scissored linkage arm assemblies in a manner forcibly collapsing the assemblies to positively drive the keys from their upwardly extended operative positions to their downwardly retracted nonoperative positions.

DETAILED DESCRIPTION

Figure 1:
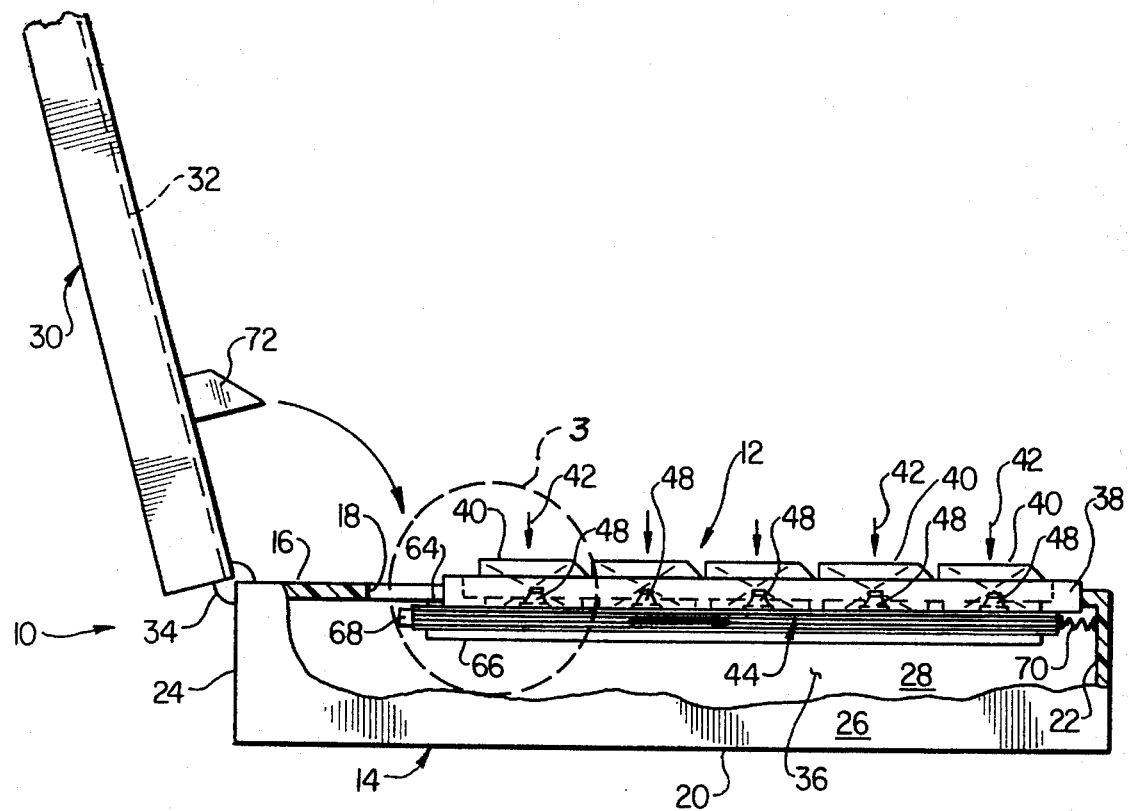
FIG. 1 is a partially sectioned, simplified side elevational view of a first electronic device, representatively a first notebook computer, having a first collapsible keyboard structure embodying principles of the present invention, the first notebook computer being in an opened orientation and the first keyboard structure being in its key-extended use configuration.
Figure 2:
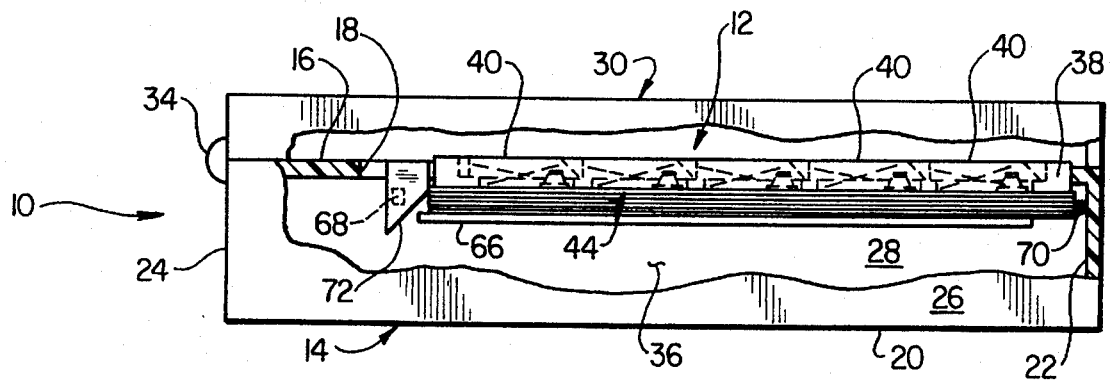
FIG. 2 is a view similar to that in FIG. 1, but with the first notebook computer in its closed orientation and the first keyboard structure being in its key-retracted storage/transport orientation.

Referring initially to FIGS. 1 and 2, the present invention provides an electronic device, representatively a portable notebook computer 10, having incorporated therein a specially designed collapsible keyboard structure 12 embodying principles of the present invention. Computer 10 includes a hollow rectangular base housing 14 having a top horizontal side wall 16 with an opening 18 therein; a bottom horizontal side wall 20; front and rear vertical end walls 22,24; and a pair of opposite vertical side walls 26,28.

A hollow rectangular lid housing 30, having a display screen 32 on its front or inner side, is pivotally secured along a hinge joint 34 to a top rear corner portion of the base housing 14. Lid housing 30 may be upwardly pivoted to place the computer 10 in an open use orientation (FIG. 1) in which the top side 16 of the base housing 14 is exposed and the display screen 32 forwardly faces the user of the computer, or downwardly pivoted to place the computer 10 in a closed storage and transport orientation (FIG. 2) in which the lid housing extends across and covers the top side of the base housing 14. Suitable latch means (not shown) are provided to releasably retain the lid housing 30 in its FIG. 2 closed orientation.

The collapsible keyboard structure 12 extends across the opening 18 in the top side wall 16 of the base housing 14 and occupies only a relatively small upper portion of the interior 36 of the base housing. Referring now to FIGS. 1, 2 and 4, the keyboard structure basically comprises a relatively thin rectangular monoblock support structure 38 that horizontally extends across the base housing top side opening 18 and is suitably anchored to the base housing 14; a series of manually depressible key cap members 40 carried for vertical movement relative to the support structure 38 (as indicated by the arrows 42 in FIG. 1) through a keystroke distance D (see FIG. 3A); and a rectangularly configured, multilayer signal pad structure 44 that underlies the support structure 38 and is transverse to the keystroke directions 42.

The signal pad structure 44, which is of a generally conventional construction, is shown in simplified exploded form in FIG. 4 and includes, from top to bottom, (1) a plastic dome sheet 46 having a spaced series of rubber key return domes 48 projecting upwardly from its top side; (2) a plastic top circuit sheet 50 having a spaced series of circular, electrically conductive pads 52 disposed on its bottom side, aligned with the domes 48, and connected to surface trace circuitry (not shown) formed on the sheet 50; (3) a plastic spacer sheet 54 having a spaced series of circular openings 56 formed therein and underlying the pads 52; (4) a plastic bottom circuit sheet 58 having a spaced series of circular, electrically conductive pads 60 disposed on its top side, aligned with the sheet openings 56, and connected to surface trace circuitry (not shown) formed on the sheet 58; and (5) a metal backing sheet 62.

The five sheet members 46,50,54,58,62 are suitably held in their indicated stacked orientation to combinatively define the overall signal pad structure 44. As illustrated in FIGS. 1–3B, the signal pad structure 44 has opposite side edge portions that are slidably retained between two sets of horizontal rail member pairs 64,66 formed on the interior sides of the base housing side walls 26 and 28. For purposes later described, the rail member pairs 64,66 support the signal pad structure 44 for horizontal front-to-rear movement relative to the base housing 14, and thus relative to the keyboard support structure 38, between a first position (FIGS. 1 and 3A) in which the left or rear side edge of the signal pad structure 44 abuts a pair of stop projections 68 formed on the inner sides of the base housing side walls 26 and 28, and a second position (FIGS. 2 and 3B) in which the signal pad structure 44 is forwardly shifted away from the stop projections 68.

With the computer lid housing 30 in its FIG. 1 open position, a plurality of schematically depicted compression spring members 70, interposed between the right or front edge of the signal pad structure 44 and the front base housing end wall 22, resiliently hold the signal pad structure 44 in its first position. However, as the lid housing 30 is subsequently closed, a spaced pair of tapered cam projections 72 disposed on the front or inner side of the lid housing 30 engage the rear side edge of the signal pad structure 44 and drive it to its second position (FIG. 2) against the resilient resistance force of the spring members 70. When the lid housing 30 is opened again, the cam projections 72 are lifted out of engagement with the signal pad structure 44 to thereby permit the spring members 70 to drive the signal pad structure 44 back to its FIG. 1 first position.

According to an important aspect of the present invention, in a manner subsequently described herein this selective shifting of the signal pad structure 44 relative to the keyboard support structure 38 is operative to automatically shift the key cap members 40 between a FIG. 3A extended operating orientation (when the signal pad structure 44 is in its leftwardly shifted first position), and a FIG. 3B retracted position (when the signal pad structure 44 is in its rightwardly shifted second position).

Turning now to FIGS. 3A, 3B, 5A and 5B, each of the key cap members 40 has a hollow, rectangular molded plastic body with a top side wall 74 with a downwardly and forwardly sloping front edge portion 76, and an open bottom side 78. A scissored linkage assembly 80 is secured to the bottom of each of the key cap members 40 and includes a first pair of scissor arms 82 and a second pair of scissor arms 84, with longitudinally intermediate portions of the arms 82 being pivotally connected to longitudinally intermediate portions of the arms 84 as indicated.

First ends of the arms 82 are joined by a cylindrical rod 86 pivotally anchored in tabs 88 projecting downwardly from the top key member wall 74, while the opposite ends of the arms 82 have outwardly projecting cylindrical pins 90 formed thereon and slidingly received in a slot 92 formed in the bottom side of the support structure 38. First ends of the arms 84 are joined by a cylindrical rod 94 having its opposite ends pivotally anchored in tabs 96 on the bottom side of the support structure 38, while the opposite ends of the arms 84 have outwardly projecting cylindrical pins 98 slidingly received in slots 100 formed on the underside of the key cap member 40.

Longitudinally intermediate portions of the scissor arms 84 are interconnected by a joining plate structure 102 having, on its underside, a bottom bearing surface 104, and a forwardly facing cam surface 106 extending at an angle to the bearing surface 104. The scissored linkage assembly 80 is movable relative to its associated key cap member 40 between an extended position shown in FIGS. 3A and 5A, and a retracted position shown in FIGS. 3B and 5B.

Figure 3A:
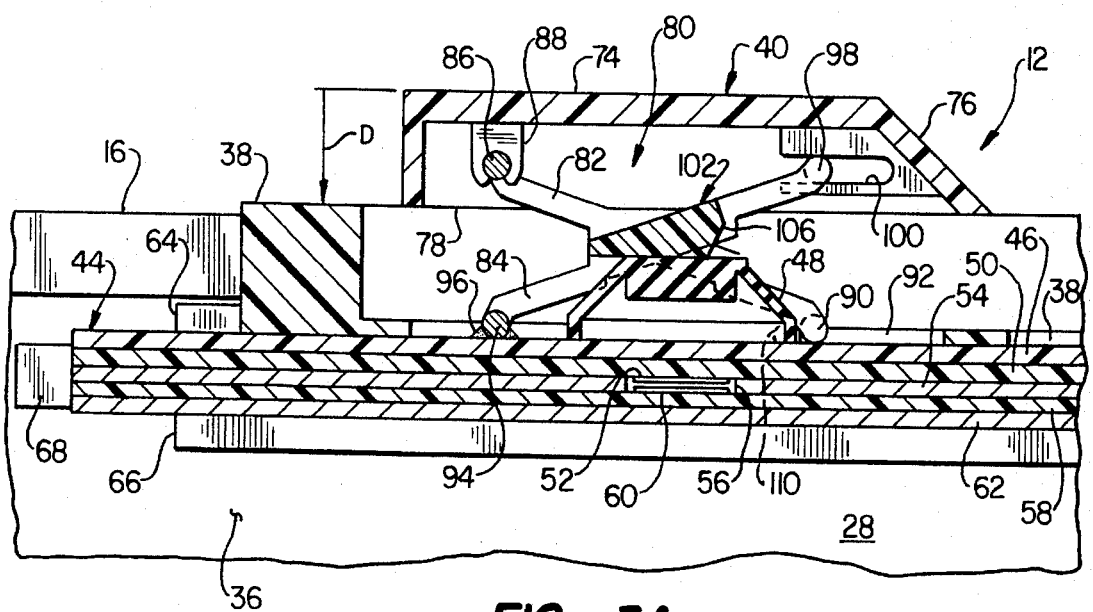
FIGS. 3A and 3B are enlarged scale cross-sectional detail views of the circled area "3" in FIG. 1 with the keyboard key cap members respectively in their extended use positions and their retracted storage/transport positions.
Figure 3B:
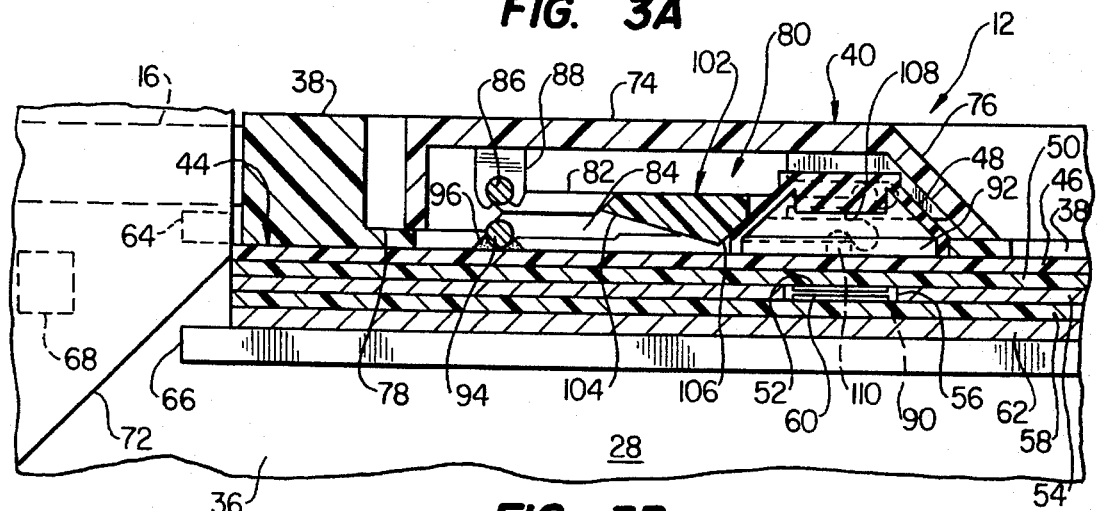
Figure 4:
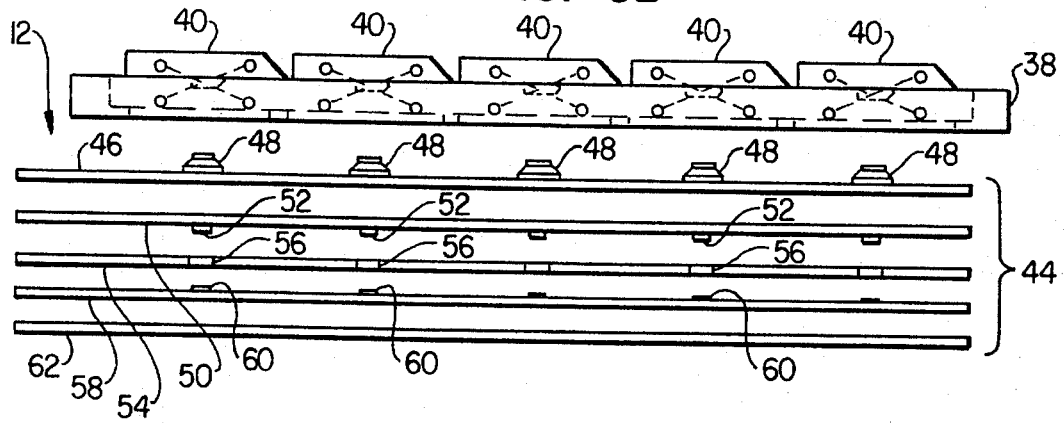
FIG. 4 is a highly schematic exploded side elevational view of the first keyboard structure.
Figure 5A:
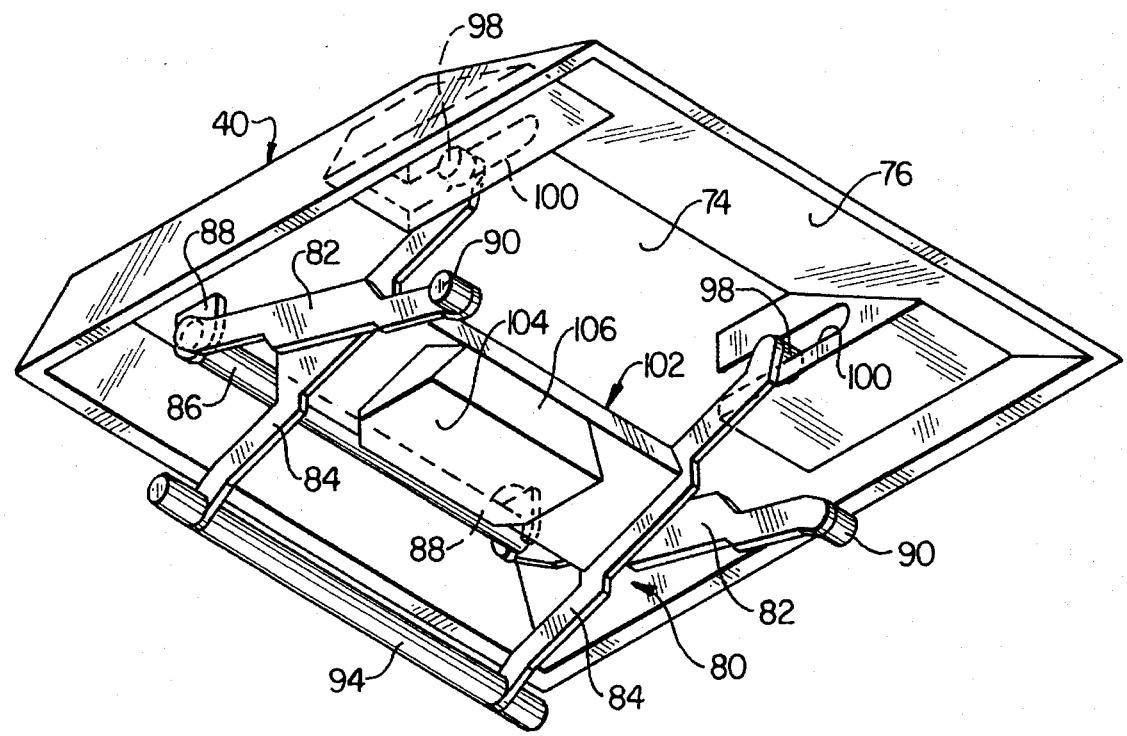
FIGS. 5A and 5B are enlarged scale bottom side perspective views of a key cap member respectively illustrating a scissored support portion thereof in its extended and retracted position.
Figure 5B:
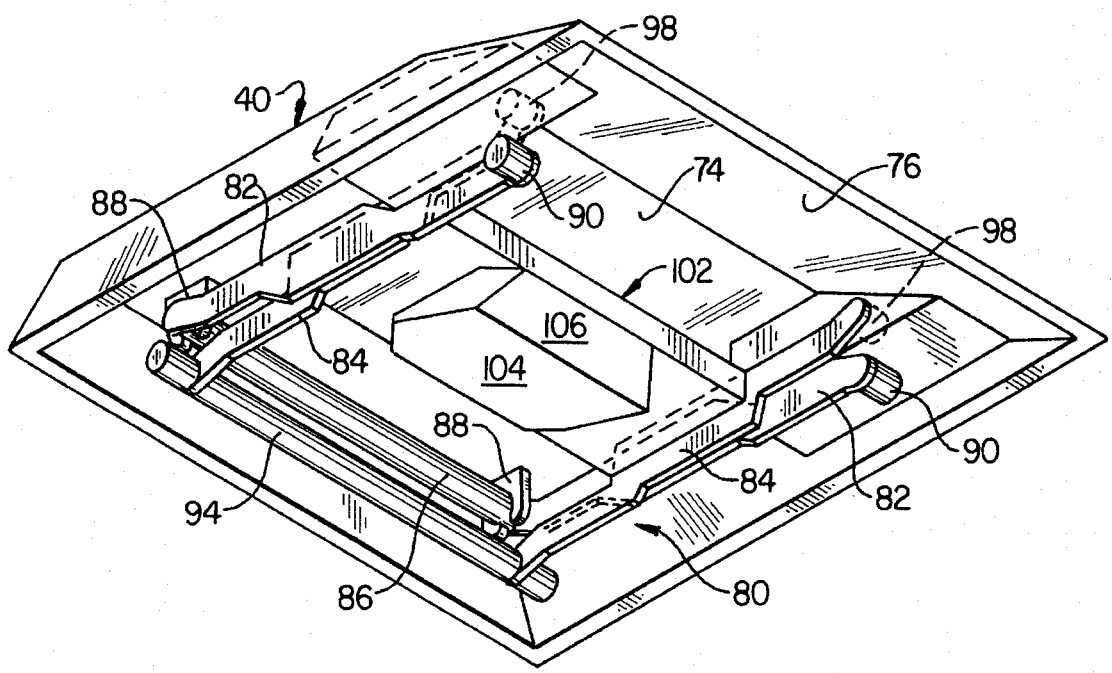

Referring now to FIGS. 3A and 3B, with the lid housing 30 opened, the signal pad structure 44 is driven to its FIG. 3A position (by the spring members 70 shown in FIG. 1), and the key cap members 40 are in their FIG. 3A operatively extended positions in which the scissored linkage assemblies 80 are in their extended positions, with the bearing surfaces 104 of the linkage assemblies 80 overlying and downwardly engaging the upper ends of the resilient key return domes 48.

When any of the key cap members 40 is manually depressed, against the resilient resistance of its associated return dome 48, the dome is downwardly deformed to cause an internal projection 108 therein to be downwardly pressed against a portion of the dome sheet 46 underlying the projection 108. This, in turn, causes the contact pad pair 52,60 underlying the projection 108 to be brought into engagement with one another and cause their associated circuitry to output an electrical signal indicative of the striking of their associated key cap member. When the key cap member 40 is released from its manually depressed orientation, it is automatically returned upwardly to its FIG. 3A position by the resilient force of its underlying key return dome 48 which functions as a return spring means.

When the signal pad structure 44 is forwardly shifted from its FIG. 3A position to its FIG. 3B position, in response to closing the lid housing 30 as previously described, the key return domes 48 are forwardly moved out from under their associated scissor linkage bearing surfaces 104, and the scissored linkage assemblies 80 are forcibly driven to their retracted FIG. 3B positions. This, in turn, downwardly drives the key cap members 40 to their FIG. 3B retracted positions, thereby reducing the overall thickness of the collapsible keyboard structure 12 by the keystroke distance D.

The forcible retraction of the key cap members 40 is effected by a spaced series of upward projections 110 formed on the top side of the dome sheet 46. Pairs of the projections 110 are positioned on opposite sides of the domes 48 and located immediately behind the opposite ends of the scissor arm pins 90. When the signal pad structure 44 is rightwardly driven away from its FIG. 3A position the projections 110 rightwardly engage and drive the pins 90 to thereby forcibly move the scissored linkage assemblies 80 from their FIG. 3A extended positions to their retracted FIG. 3B positions. Alternatively, the projections 110 could be omitted and the key cap members 40 permitted to fall by gravity to their retracted FIG. 3B positions when the signal pad structure 44 is rightwardly driven from its FIG. 3A position to its FIG. 3B position.

When the lid housing 30 is opened again, the resulting leftward or rearward driven movement of the signal pad structure 44 causes the sloping rear side surfaces of the key return domes 48 to rearwardly engage the forwardly and upwardly sloped cam surfaces 106 of the linkage assemblies 80 in a manner forcing the linkage assemblies 80 back to their FIG. 3A extended positions in which the upper ends of the domes 48 underlie and engage the linkage assembly bearing surfaces 104 to thereby return the key cap members 40 to their upwardly extended operative positions.

From the foregoing it can be seen that the collapsible keyboard structure 12 of the present invention effectively reduces the thickness of the keyboard structure in its FIG. 3B storage/transport orientation by the key stroke distance D, and automatically brings the keyboard structure to this orientation in response to the closure of the lid housing 30. Accordingly, the key stroke distance D does not have to be undesirably reduced (compared to the corresponding key stroke distance of a desktop computer keyboard) to reduce the storage/transport thickness of the keyboard structure 12.

While the keyboard structure 12 has been representatively depicted as having the keyboard support structure 38 fixedly secured to the base housing 14, with the signal pad structure 44 being shiftable relative to the support structure 38, it will be appreciated that, alternatively, the keyboard support structure 38 could be shifted relative to the signal pad structure 44 if desired.

Additionally, while the key structures 40 have been representatively illustrated as being supported on the keyboard carrying structure 38 using scissored linkage assemblies, other means of supporting the key cap members 40 for vertical movement could be utilized if desired. Moreover, spring return means other than the rubber key return domes 48 could be provided for forward and rearward shifting relative to the key cap members if desired.

Furthermore, it will be readily appreciated that, although surfaces 104 and 106 are representatively illustrated as being formed on portion 102 of scissor arm linkage assembly 80, these surfaces could also be formed on a bottom side of wall 74 of the key cap member 40 if desired. In that manner, dome member 48 would rampingly contact the key cap member 40 directly as structure 44 is shifted leftwardly from its FIG. 3B position to its FIG. 3A position.

Figure 6:
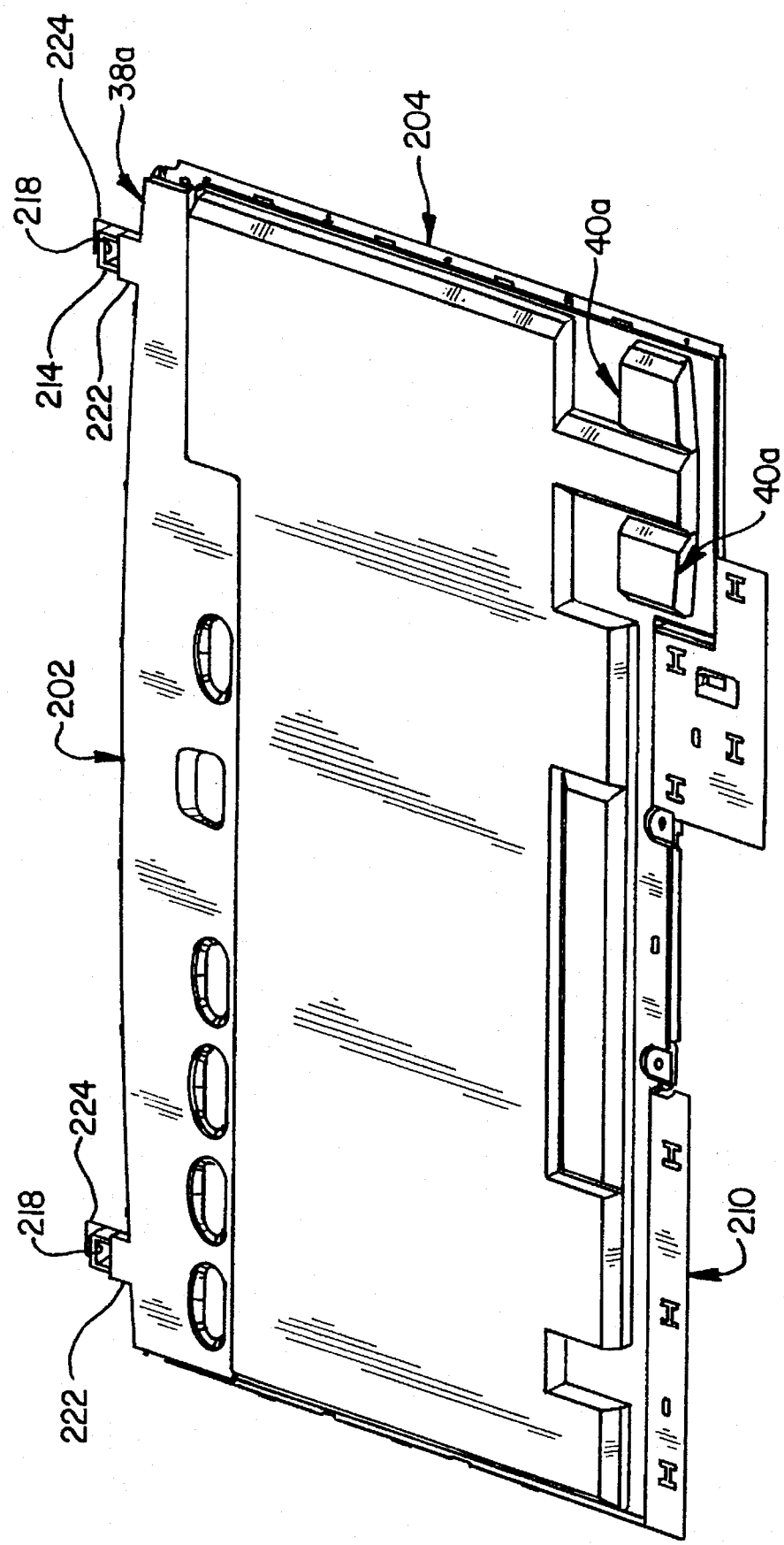
FIG. 6 is a top side perspective view of a second collapsible keyboard structure embodying principles of the present invention.
Figure 7:
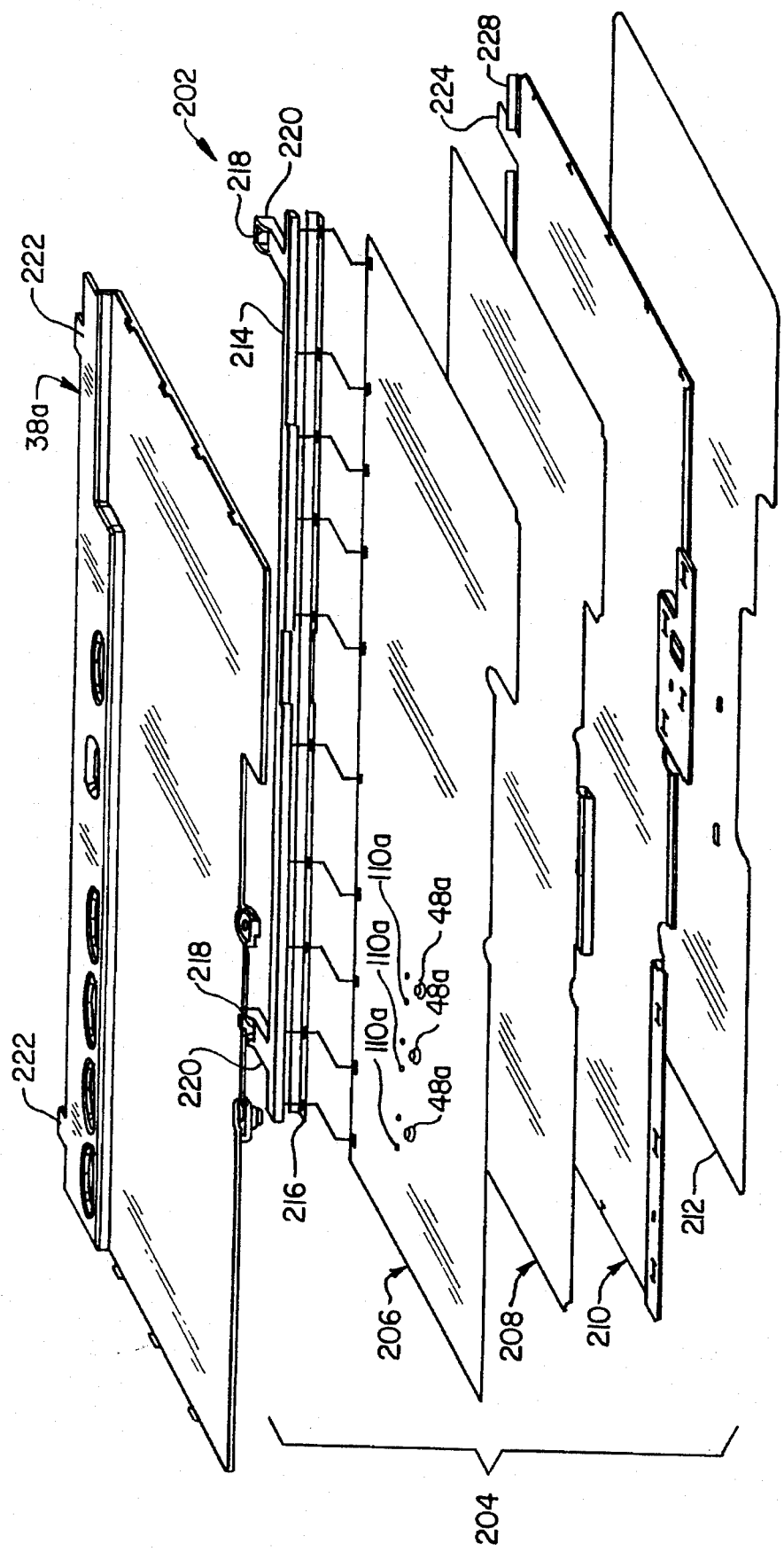
FIG. 7 is a top side exploded perspective view of the second keyboard structure.
Figure 8:
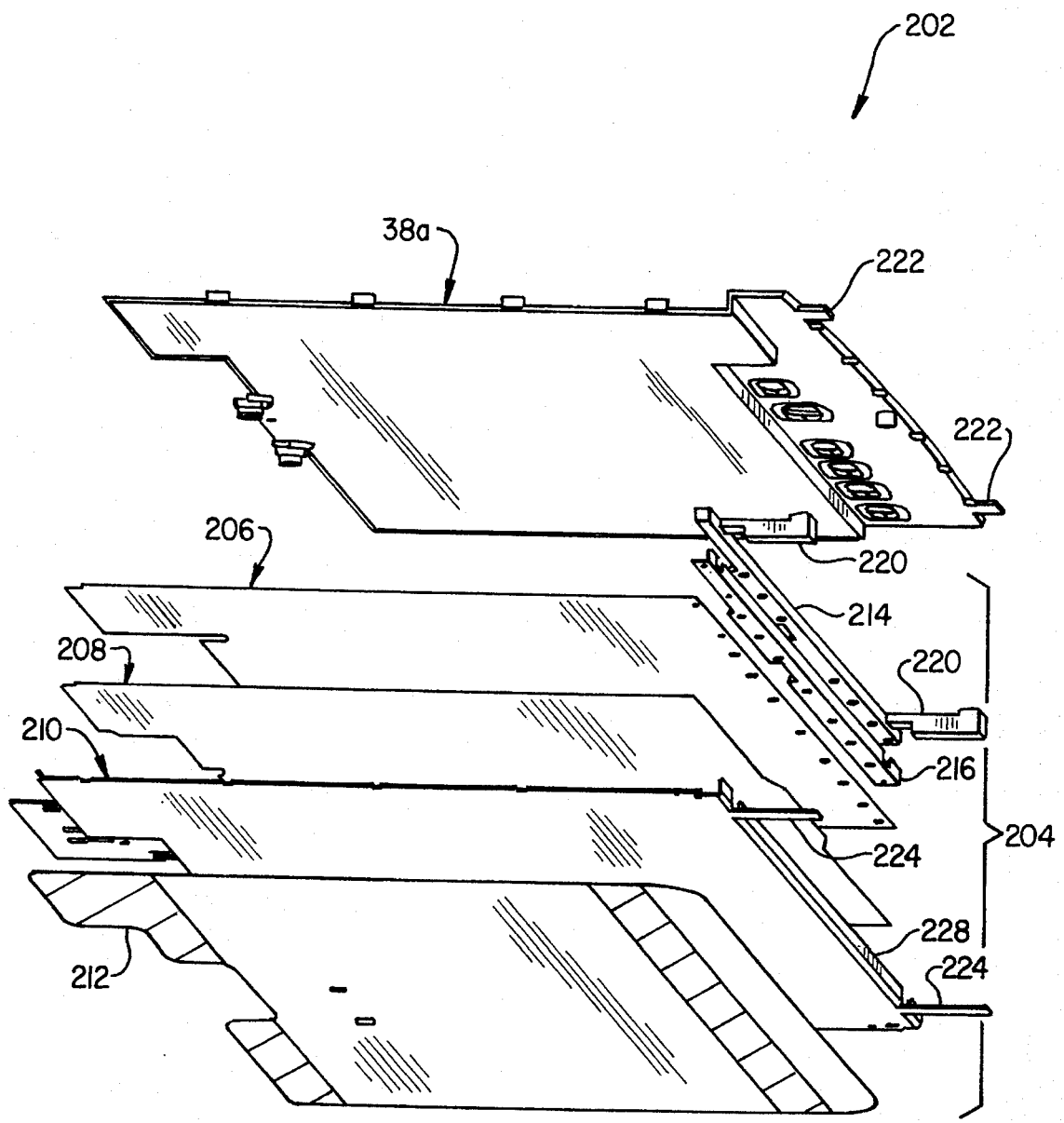
FIG. 8 is a bottom side exploded perspective view of the second keyboard structure.

Referring additionally now to FIGS. 6–8, an alternate construction of a specially designed collapsible keyboard structure 202 embodying principles of the present invention is representatively illustrated. Collapsible keyboard structure 202 may be utilized in an electronic device, such as computer 250 (see FIG. 10). In the following description of the collapsible keyboard structure 202, elements thereof which perform functions substantially similar to previously described elements of collapsible keyboard structure 12 will be indicated with the same reference numerals as previously used, with an added suffix "a".

The keyboard structure 202 basically comprises a relatively thin rectangular monoblock support structure 38a that horizontally extends across a top side opening 254 of a base housing 252 (see FIG. 10) and is suitably anchored to the base housing; a series of manually depressible key cap members 40a (some of which are schematically shown in FIG. 6, none of which are shown in FIG. 7 for clarity of illustration, and which are not visible in FIG. 8) carried for vertical movement relative to the support structure 38a through a keystroke distance; and a rectangularly configured, multilayer signal pad structure 204 that underlies the support structure 38a.

The signal pad structure 204 is shown in exploded form in FIGS. 7 and 8, and includes, from top to bottom, (1) a plastic dome sheet 206 having a spaced series of rubber key return domes 48a (not visible in FIG. 8) projecting upwardly from its top side; (2) a plastic membrane sheet 208 comprising a top circuit sheet (such as circuit sheet 50) having a spaced series of circular, electrically conductive pads (such as pads 52) disposed on its bottom side, alignable with the domes 48a, and connected to surface trace circuitry (not shown) formed on the circuit sheet, a plastic spacer sheet (such as spacer sheet 54) having a spaced series of circular openings formed therein and underlying the conductive pads, and a plastic bottom circuit sheet (such as circuit sheet 58) having a spaced series of circular, electrically conductive pads (such as pads 60) disposed on its top side, aligned with the sheet openings and connected to surface trace circuitry (not shown) formed on the bottom circuit sheet; (3) a metal backing sheet 210; and (4) an insulator sheet 212 for electrically insulating the metal backing sheet 210.

The four sheet members 206,208,210,212 are suitably held in their indicated stacked orientation to combinatively define the overall signal pad structure 204. Unlike signal pad structure 44, in signal pad structure 204 only the dome sheet 206 is horizontally displaced relative to the support structure 38a to alternately extend and retract the key cap members 40a. The membrane sheet 208, metal backing sheet 210, and insulator sheet 212 are suitably fixedly mounted relative to the support structure 38a.

The dome sheet 206 has a specially designed bar actuator 214 and bar support 216 mounted to a rear edge thereof for slidably displacing the dome sheet horizontally relative to the support structure 38a as will be further described hereinbelow. The bar actuator 214 has upwardly facing openings 218 formed on arms 220 which extend rearwardly from the bar actuator. The bar actuator 214 is preferably made of a molded plastic material, although other materials may be utilized without departing from the principles of the present invention. The bar support 216 is secured intermediate the bar actuator 214 and the dome sheet 206 and operates to transfer forces from the bar actuator evenly across the rear edge of the dome sheet. Preferably, the bar actuator 214 and bar support 216 extend transversely and completely across the rear edge of the dome sheet 206 so that the dome sheet may be slid rearwardly and forwardly relative to the support structure 38a without buckling of the dome sheet or localized stresses at the rear edge thereof. Arms 220 are vertically retained by tabs 222 extending rearwardly from the support structure 38a, and by tabs 224 extending rearwardly from the metal backing sheet 210.

When the keyboard structure 202 is in a use configuration thereof, dome sheet 206 is in a first, forwardly disposed, position relative to the support structure 38a and dome return members 48a on the dome sheet are in an underlying relationship to joining plate structures, (such as joining plate structures 102, see FIG. 3A) on scissored linkage assemblies (such as scissored linkage assemblies 80, see FIG. 3A) thereby extending the key cap members 40a. When the keyboard structure 202 is in a collapsed configuration thereof, dome sheet 206 is in a second, rearwardly disposed, position relative to the support structure 38a and the dome members 48a on the dome sheet do not underlie the joining plate structures, thereby permitting the key cap members 40a to retract, and projections 110a on the dome sheet forcibly retract the key cap members as described above for projections 110 and key cap members 40 of signal pad structure 44. Thus, in this respect, the keyboard structure 202 operates somewhat oppositely as compared to keyboard structure 12, the dome members 48a on dome sheet 206 displacing rearwardly to retract the key cap members 40a in the keyboard structure 202, instead of displacing forwardly to retract the key cap members 40 in the keyboard structure 12. Therefore, in the collapsible keyboard structure 202, the scissored linkage assemblies are oppositely oriented relative to the key cap members 40a and support structure 38a as compared to the scissored linkage assemblies 80, key cap members 40 and support structure 38 of keyboard structure 12. The manner in which the dome sheet 206 is horizontally shifted alternately to its first and second positions will be more fully described hereinbelow.

Figure 9:
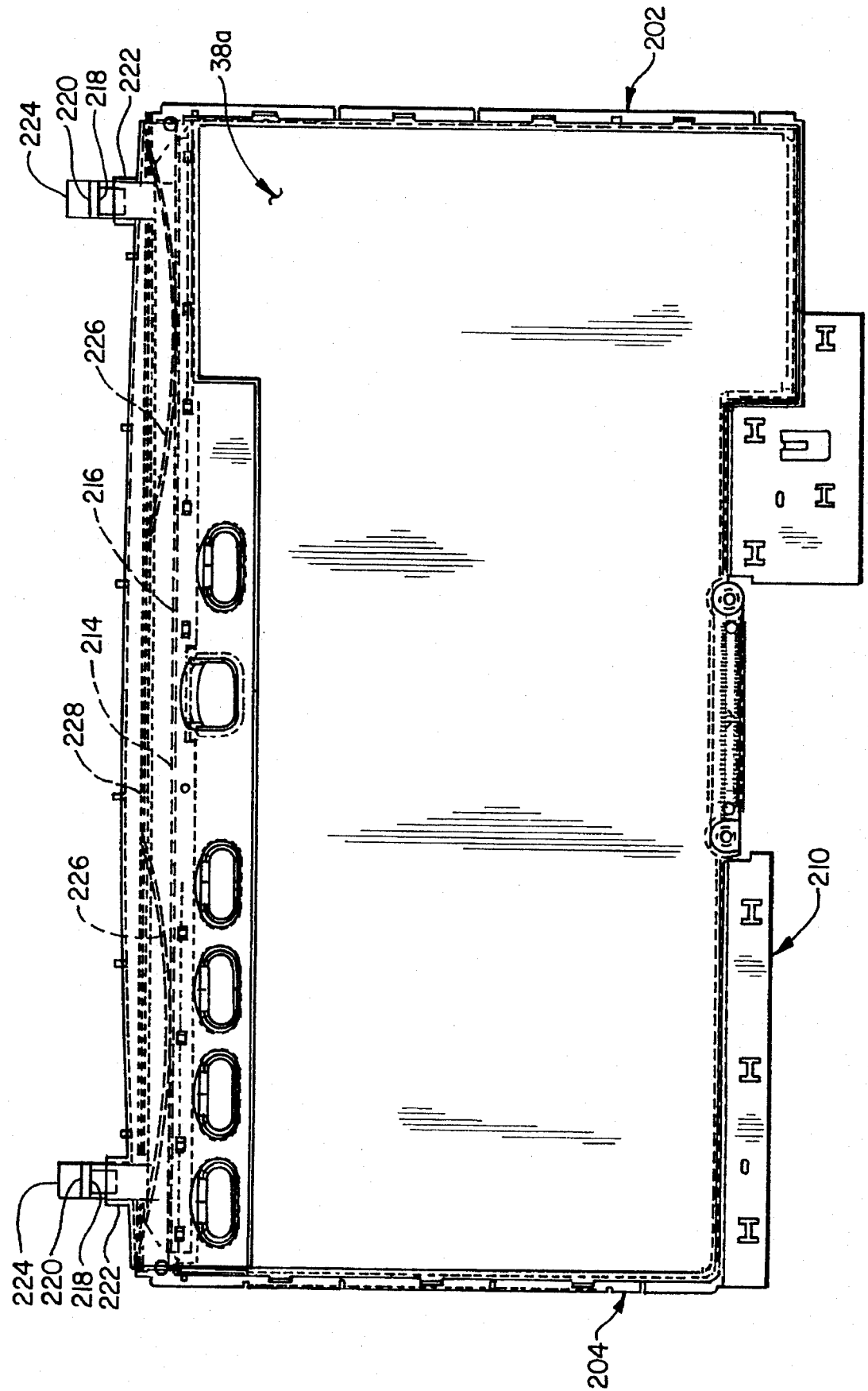
FIG. 9 is a top side plan view of the second collapsible keyboard structure.

Referring additionally now to FIG. 9, the assembled keyboard structure 202 is seen from a top plan view thereof. The signal pad structure 204 is attached to the support structure 38a, the key cap members 40a not being shown for purposes of clarity of illustration. In this view the manner in which the dome sheet 206 (see FIGS. 6–8) is biased to its first position relative to the support structure 38a may be clearly seen.

Two compression members, representatively leaf springs 226, are disposed laterally intermediate a rear side of the bar actuator 214 and an upstanding rear side 228 formed on the backing sheet 210. Rear side 228 is more clearly seen in FIG. 8. Thus, when keyboard structure 202 is assembled, leaf springs 226 are somewhat compressed between the bar actuator 214 and the rear side 228 of the backing sheet 210, forwardly biasing the dome sheet 206 to its first position relative to the support structure 38a. When the keyboard structure 202 is operatively installed in the computer 250 (see FIG. 10), and the display 256 is rotated downwardly to its closed position, projections 258 formed on the computer's lid 260 engage the openings 218 formed on the arms 220 and force the bar actuator 214, and the dome sheet 206 to which it is attached, rearwardly, thereby further compressing the leaf springs 226. When the computer's lid 260 is completely closed, the dome sheet 206 is in its second position relative to the support structure 38a, thereby permitting the key cap members 40a to retract.

Figure 10:
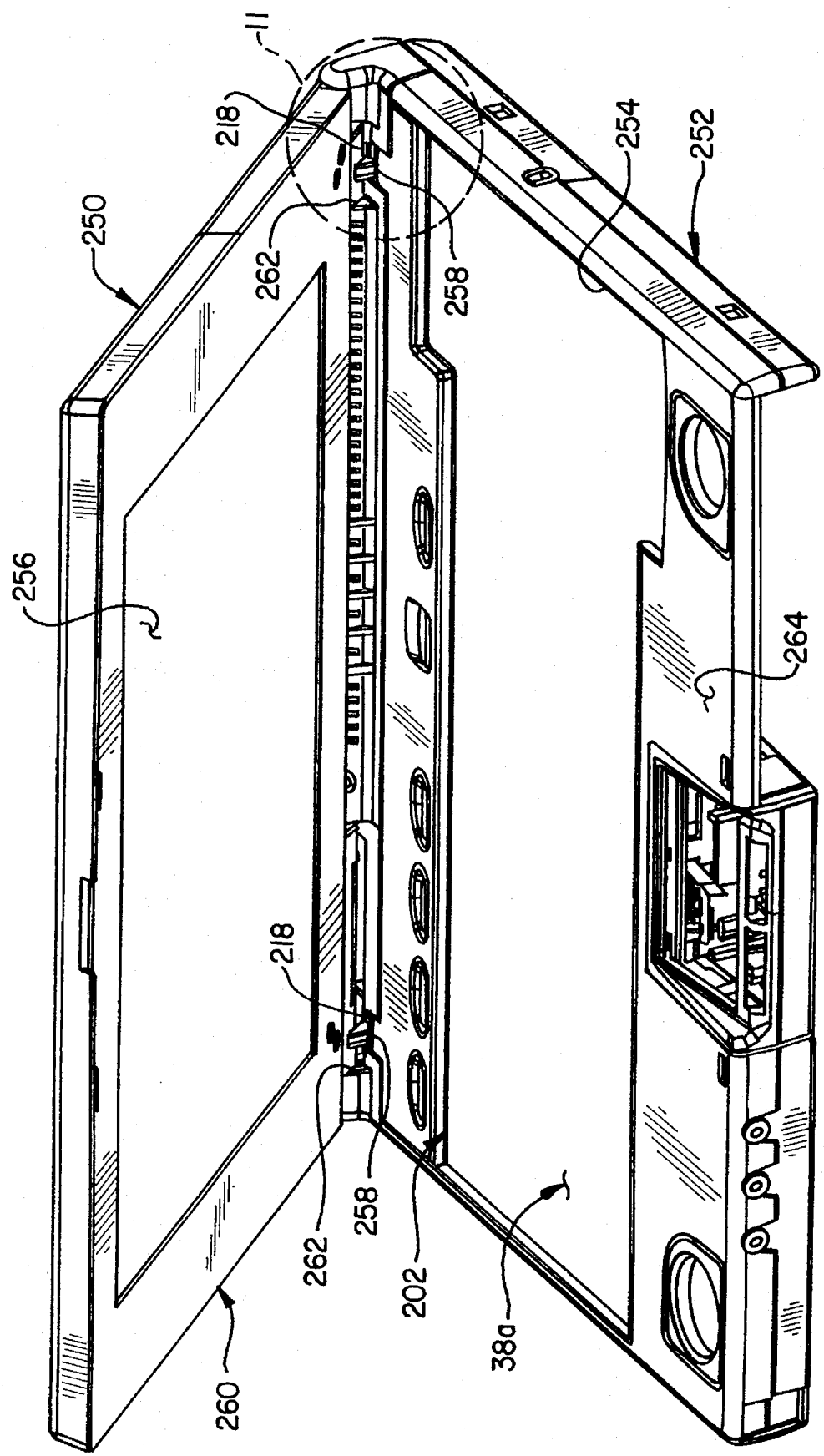
FIG. 10 is a top side perspective view of a second electronic device, representatively a second notebook computer, incorporating the second collapsible keyboard structure therein.

Referring additionally now to FIG. 10, the computer 250 is representatively illustrated. A hollow rectangular lid 260, having a display screen 256 on its front or inner side, is pivotally secured along hinge joints 262 to a top rear corner portion of the base housing 252. Lid 260 may be upwardly pivoted to place the computer 250 in an open use orientation (similar to that shown for computer 10 in FIG. 1) in which the top side 264 of the base housing 252 is exposed and the display screen 256 forwardly faces the user of the computer, or downwardly pivoted to place the computer 250 in a closed storage and transport orientation (similar to that shown for computer 10 in FIG. 2) in which the lid extends across and covers the top side of the base housing. Suitable latch means (not shown) are provided to releasably retain the lid 260 in its closed orientation.

The collapsible keyboard structure 202 extends across the opening 254 in the top side 264 of the base housing 252 and occupies only a relatively small upper portion of the interior of the base housing.

With the computer lid 260 in its illustrated partially open position, the leaf springs 226, interposed between the bar actuator 214 and the backing sheet rear side 228, resiliently hold the dome sheet 206 in its first position. However, as the lid 260 is subsequently closed, a spaced pair of projections 258 disposed on the front or inner side of the lid 260 engage the openings 218 of the signal pad structure 204 and drive the dome sheet 206 to its second position against the resilient resistance force of the springs 226. When the lid 260 is fully opened, the projections 258 are lifted out of engagement with the openings 218 of signal pad structure 204 to thereby permit the springs 226 to drive the dome sheet 206 back to its first position.

This selective shifting of the dome sheet 206 relative to the keyboard support structure 38a is operative to automatically shift the key cap members 40a between an extended operating orientation (when the dome sheet 206 is in its forwardly shifted first position), and a retracted position (when the dome sheet 206 is in its rearwardly shifted second position).

As with key cap members 40 of the previously described keyboard structure 12, each of the key cap members 40a has a hollow, rectangular molded plastic body with a top side wall with a downwardly and forwardly sloping front edge portion, and an open bottom side. A scissored linkage assembly 80 is secured to the bottom of each of the key cap members 40a and includes a first pair of scissor arms 82 and a second pair of scissor arms 84, with longitudinally intermediate portions of the arms 82 being pivotally connected to longitudinally intermediate portions of the arms 84 as indicated in FIG. 3A. In keyboard structure 202, however, dome members 48a are shifted rearwardly instead of forwardly to permit the key cap members 40a to retract. Therefore, in keyboard structure 202, the scissored linkage assembly 80 is oppositely oriented relative to the key cap member 40a, as compared to scissored linkage assembly 80 and key cap member 40 shown in FIG. 3A.

With the lid 260 partially open as shown in FIG. 10, the dome sheet 206 is driven to its first position by the springs 226 (see FIG. 9), and the key cap members 40a are in their operatively extended positions in which the scissored linkage assemblies 80 are in their extended positions, with the bearing surfaces 104 of the linkage assemblies 80 overlying and downwardly engaging the upper ends of the resilient key return domes 48a.

When the dome sheet 206 is rearwardly shifted from its first position to its second position, in response to closing the lid 260 as previously described, the key return domes 48a are rearwardly moved out from under their associated scissor linkage bearing surfaces 104, and the scissored linkage assemblies 80 are forcibly driven to their retracted positions. This, in turn, downwardly drives the key cap members 40a to their retracted positions, thereby reducing the overall thickness of the collapsible keyboard structure 202 by the keystroke distance.

The forcible retraction of the key cap members 40a is effected by a spaced series of upward projections 110a formed on the top side of the dome sheet 206 as previously described for projections 110 of keyboard structure 12. When the dome sheet 206 is rearwardly driven away from its first position the projections 110a rearwardly engage and drive the pins 90 to thereby forcibly move the scissored linkage assemblies 80 from their extended positions to their retracted positions.

When the lid 260 is fully opened again, the resulting forward driven movement of the dome sheet 206 causes the sloping side surfaces of the key return domes 48a to forwardly engage the rearwardly and upwardly sloped cam surfaces 106 of the linkage assemblies 80 in a manner forcing the linkage assemblies 80 back to their extended positions in which the upper ends of the domes 48a underlie and engage the linkage assembly bearing surfaces 104 to thereby return the key cap members 40a to their upwardly extended operative positions.

From the foregoing it can be seen that the collapsible keyboard structure 202 of the present invention effectively reduces the thickness of the keyboard structure in its storage/transport orientation by the key stroke distance, and automatically brings the keyboard structure to this orientation in response to the closure of the lid 260. Accordingly, the key stroke distance does not have to be undesirably reduced (compared to the corresponding key stroke distance of a desktop computer keyboard) to reduce the storage/transport thickness of the keyboard structure 202.

While the keyboard structure 202 has been representatively depicted as having the keyboard support structure 38a fixedly secured to the base housing 252, with the dome sheet 206 being shiftable relative to the support structure 38a, it will be appreciated that, alternatively, the keyboard support structure 38a could be shifted relative to the dome sheet 206 if desired.

Figure 11:
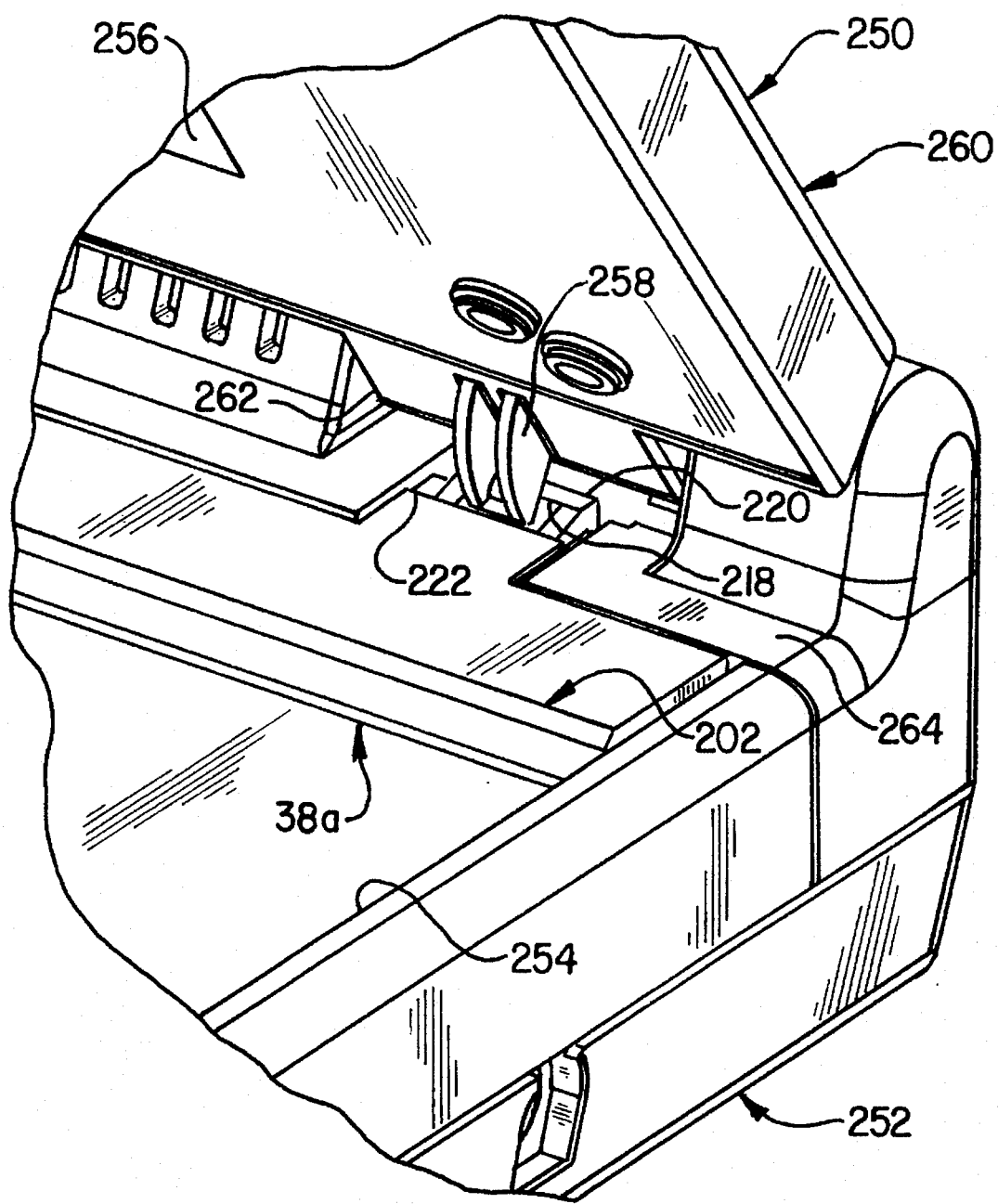
FIG. 11 is an enlarged scale perspective detail view of the circled area labeled "11" in FIG. 10.

Referring additionally now to FIG. 11, an enlarged perspective view is shown of one of the projections 258 engaging one of the openings 218 of the signal pad structure 204.

The foregoing detailed description is to be clearly understood as being given by way of illustration and example only, the spirit and scope of the present invention being limited solely by the appended claims.

What is claimed is:

1. A collapsible keyboard structure for a portable computer, comprising:

a key support structure having top and bottom sides;

a series of keys each carried on said top side of said key support structure for vertical movement relative thereto, through a vertical key stroke distance, between extended and retracted positions;

a base structure carried beneath said key support structure, having a top side facing said bottom side of said key support structure, and further having a sheet portion slidably disposed thereon, said base structure being attached to said key support structure; and a spaced series of resilient key return members disposed on said sheet portion facing said top side of said base structure, said key support structure and said sheet portion being horizontally shiftable relative to one another between a first position in which said key return members underlie and resiliently hold said keys in said extended positions thereof, each of said key return members being vertically compressed only when said key support structure and said sheet portion are in said first position and a corresponding one of said keys is moved between said extended and said retracted positions, and a second position in which said key return members permit said keys to be moved from said extended positions thereof to said retracted positions thereof without vertically compressing said resilient key return members.

2. The collapsible keyboard structure of claim 1 further comprising:

cooperatively engageable means on said keys and said base structure for forcibly driving said keys from said extended positions thereof to said retracted positions thereof in response to shifting of said sheet portion and said key support structure from said first position thereof to said second position thereof.

3. The collapsible keyboard structure of claim 2 wherein:

said keys are secured to said key support structure by scissored linkage arm assemblies, and said cooperatively engageable means include portions of said scissored linkage arm assemblies and a spaced series of projections formed on said top side of said base structure and operative to drivingly engage and move said portions of said scissored linkage arm assemblies, in response to a shifting of said sheet portion and said key support structure from said first position thereof to said second position thereof, in a manner forcibly collapsing said scissored linkage arm assemblies.

4. The collapsible keyboard structure of claim 1 wherein:

said keys are secured to said key support structure by scissored linkage arm assemblies each having a central portion with mutually angled bearing and cam surfaces thereon, said resilient key return members are hollow elastomeric dome members having upper ends and sloping side portions, said upper ends of said dome members underlying and upwardly engaging said bearing surfaces when said sheet portion and said key support structure are in said first position thereof, and said cam surfaces being positioned and configured to be slidingly engaged by said sloping dome member side portions in a manner driving said key members from said retracted positions thereof to said extended positions thereof in response to shifting of said sheet portion and said key support structure from said second position thereof to said first position thereof.

5. The collapsible keyboard structure of claim 1 wherein:

said key support structure is a generally rectangular monoblock support structure.

6. The collapsible keyboard structure of claim 1 wherein:

said base structure is a multilayered signal pad structure with closable electrical contact structures underlying said resilient key return members when said sheet portion and said key support structure are in said first position.

7. A collapsible keyboard structure for an electronic device, such as a portable computer, comprising:

a key support structure having top and bottom sides;

a series of keys disposed on said top side of said key support structure;

a series of scissored linkage arm assemblies interconnected between said keys and said key support structure and permitting said keys to be vertically moved relative to said key support structure, through a vertical key stroke distance, between extended and retracted positions, each of said scissored linkage arm assemblies having a central portion with mutually angled bearing and cam surfaces thereon; and a multilayered signal pad structure carried beneath said key support structure and having a top side facing said bottom side of said key support structure, said signal pad structure having a spaced series of closeable electrical contact structures thereon, and a spaced series of elastomeric key return dome members secured to a shift member slidably disposed on said top side of said signal pad structure and overlying said contact structures, each of said key return dome members having an upper end and a sloping side surface, said key support structure and said shift member being horizontally shiftable relative to one another between a first position in which said upper ends of said key return dome members underlie and upwardly engage said bearing surfaces and hold said key members in said extended positions thereof, with said scissored linkage arm assemblies in extended positions thereof, and a second position in which said upper ends of said key return dome members are horizontally offset from said bearing surfaces and said keys are in said retracted positions thereof with said scissored linkage arm assemblies in collapsed positions thereof, and said cam surfaces and said sloping side surfaces of said key return dome members being relatively positioned and configured to be interengaged, in response to a shifting of said key support structure and said shift member from said second position to said first position, in a manner driving said keys from said retracted positions thereof to said extended positions thereof.

8. A portable computer comprising:

a base housing portion having a top side;

a lid housing portion secured to said base housing portion for pivotal movement relative thereto between a closed position in which said lid housing portion extends across and covers said top side, and an open position in which said lid housing portion uncovers and exposes said top side; and a collapsible keyboard structure including:

a key support structure extending across said top side of said base housing portion and having top and bottom sides, a series of keys each carried on said top side of said key support structure for vertical movement relative thereto, through a key stroke distance, between an upwardly extended operative position and a downwardly retracted nonoperative position, a base structure underlying said key support structure and having a top side facing said bottom side of said key support structure, and further having a sheet member slidingly disposed on said base structure top side, one of said sheet member and said key support structure being horizontally shiftable relative to the other of said sheet member and said key support structure between a first position and a second position, and cooperatively engageable means on said keys and said sheet member for driving said keys from said retracted nonoperative positions thereof to said extended operative positions thereof in response to a shifting of said one of said sheet member and said key support structure from said second position thereof to said first position thereof.

9. The portable computer of claim 8 wherein:

said key support structure is anchored to said base housing portion, and said sheet member is horizontally shiftable relative to said key support structure.

10. The portable computer of claim 8 further comprising:

first shifting means, responsive to opening said lid housing portion, for shifting said one of said sheet member and said key support structure from said second position thereof to said first position thereof, and second shifting means, responsive to closing said lid housing portion, for shifting said one of said sheet member and said key support structure from said first position thereof to said second position thereof.

11. The portable computer of claim 10 wherein:

said first shifting means include spring means for resiliently biasing said one of said sheet member and said key support structure toward said first position thereof, and said second shifting means include projecting means carried by said lid housing portion and operative, in response to closure of said lid housing portion, to engage said one of said sheet member and said key support structure and drive it from said first position thereof to said second position thereof.

12. The portable computer of claim 8 wherein:

said keys are secured to said key support structure by scissored linkage arm assemblies each having a central portion with mutually angled bearing and cam surfaces thereon, said sheet member has a spaced series of resilient key return members projecting upwardly from said top side of said base structure, and said cooperatively engageable means include said cam surfaces and said resilient spring return members.

13. The portable computer of claim 12 wherein:

said base structure is a multi-layer signal pad structure having closeable electrical contact structures underlying said resilient key return members on said sheet member when said sheet member and said key support structure are in said first position thereof.

14. The portable computer of claim 13 wherein:

said resilient key return members are elastomeric key return dome members.

15. An electronic device comprising:

a base housing portion having a top side;

a lid housing portion secured to said base housing portion for pivotal movement relative thereto between a closed position in which said lid housing portion extends across and covers said top side, and an open position in which said lid housing portion uncovers and exposes said top side; and a collapsible keyboard structure including:

a key support structure anchored to said base housing portion and extending across said top side thereof, said key support structure having top and bottom sides, a series of keys each secured to said top side of said key support structure by a scissored linkage arm structure permitting the key to move vertically relative to said key support structure, through a key stroke distance, between an upwardly extended operative position and a downwardly retracted inoperative position, each of said linkage arm structures having a central portion with mutually angled bearing and cam surfaces thereon, a multi-layered signal pad structure having a top side underlying and facing said bottom side of said key support structure, said signal pad structure having a spaced series of resilient key return domes projecting upwardly from an upper layer slidably mounted to said signal pad structure top side, support means for mounting said signal pad structure on said base housing portion for horizontal movement of said upper layer relative to said key support structure between a first position in which said key return domes underlie and engage said bearing surfaces and hold said keys in said upwardly extended operative positions thereof, and a second position in which said key return domes are shifted out of engagement with said bearing surfaces, said key return domes being positioned and configured to engage said cam surfaces in a manner forcibly moving said key members from said retracted positions to said extended positions in response to movement of said upper layer from said second position thereof to said first position thereof, first shifting means for shifting said upper layer from said second position thereof to said first position thereof in response to opening said lid housing portion, and second shifting means for shifting said upper layer from said first position thereof to said second position thereof in response to closing said lid housing portion.

16. The electronic device of claim 15 wherein said first shifting means include:

spring means interconnected within said signal pad structure and operative to forcibly move said upper layer from said second position thereof to said first position thereof in response to opening said lid housing portion.

17. The electronic device of claim 16 wherein said second shifting means include:

engagement means carried by said lid housing portion and operative, in response to closure of said lid housing portion, to engage said signal pad structure and return said upper layer to said second position against the resilient force of said spring means.

18. The electronic device according to claim 16 wherein said electronic device is a computer.

19. The electronic device according to claim 18 wherein said computer is a portable computer.

20. The electronic device according to claim 19 wherein said portable computer is a notebook computer.

* * * * *